United States Patent [19]
Hawkins

[11] 4,266,800
[45] May 12, 1981

[54] TOW BAR APPARATUS

[76] Inventor: Wallace H. Hawkins, Old Buncombe Rd., Greenville, S.C. 29611

[21] Appl. No.: 942,945

[22] Filed: Sep. 18, 1978

[51] Int. Cl.³ .............................................. B60D 1/14
[52] U.S. Cl. ........................... 280/491 D; 280/491 E; 280/480; 280/502
[58] Field of Search .......... 280/491 R, 491 D, 491 A, 280/491 E, 502, 480

[56] References Cited

U.S. PATENT DOCUMENTS

| | | | |
|---|---|---|---|
| 3,119,631 | 1/1964 | Wanamaker | 280/502 X |
| 3,385,610 | 5/1968 | Vezina | 280/491 A |
| 3,806,162 | 4/1974 | Milner | 280/491 R |

FOREIGN PATENT DOCUMENTS 145878  6/1954  Sweden .............................. 280/491 D Primary Examiner—John P. Silverstrim
Attorney, Agent, or Firm—Bailey, Dority & Flint

[57] ABSTRACT

A towing apparatus of enhanced stability is illustrated for attaching an automobile and other vehicle to be towed to a towing vehicle wherein diverging arms are pivoted adjacent one end of a central bar or frame member which extends rearwardly from a towing vehicle with a slide carried thereon for attachment at predetermined positions along the bar, and diverging links each having pivotal connection on one end on a respective arm and on the other end to the slide member. A chain attaching means is provided for use with the tow bar wherein respective chains carried by the arms are positioned in spread relation adjacent a free end of respective arms and extend inwardly across one another and are attachable to spaced vehicle frame members thus serving as a towing and positioning chain with an extending portion acting as a safety chain.

2 Claims, 4 Drawing Figures

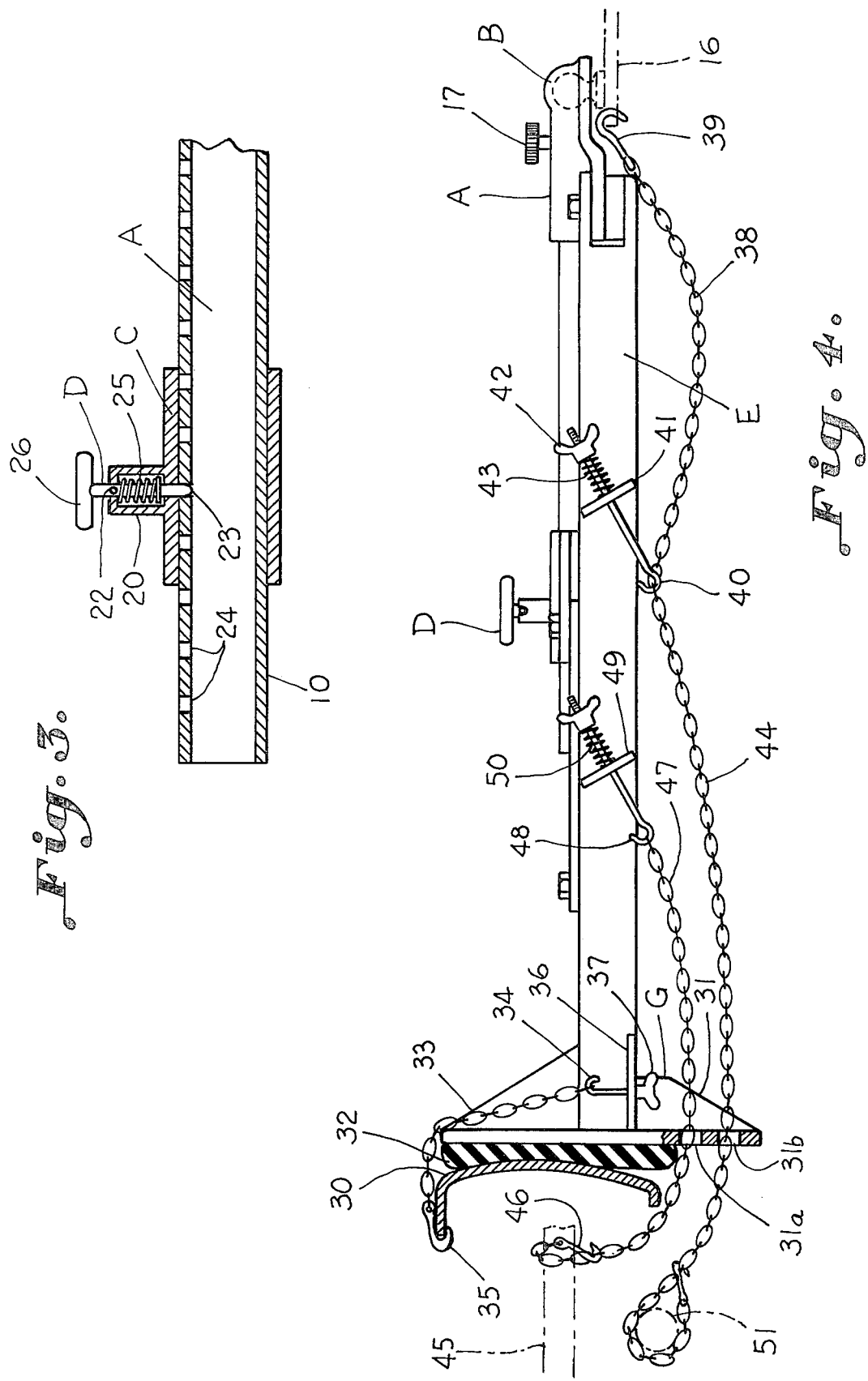

TOW BAR APPARATUS

BACKGROUND OF THE INVENTION

A tow bar constructed in accordance with the prior art is illustrated in U.S. Pat. No. 3,000,652. This patent illustrates a pair of diverging arms fixedly carried by a frame member having a ball connection and the like with the towing vehicle, said arms being braced by links fixed on one end to the frame member and extending toward an opposite end of the arms. Such towing apparatus possesses disadvantages in that it is cumbersome and awkward to transport same since the arms remain in diverging relationship. Another disadvantage is that the links which fasten the arms to the frame member tend to become bent after prolonged periods of rough use. Furthermore, there is considerable difficulty in making the necessary attachments since the chains and the like must be rigged manually to respective parts on the towing vehicle and on the tow bar in order to effect a safety arrangement. Other arrangements have been provided utilizing diverging pivoted arms which are collapsible for easy transport, but such are not fastenable in rigid distended positions.

Accordingly, it is an important object of this invention to provide a relatively simple towing attachment which is of rugged construction so as to provide a very strong tow bar capable of prolonged periods of effective use.

Another important object of the invention is to provide a towing attachment which is readily adjustable having collapsible arms which facilitate transportation but which may be spread and attached in relation to the respective vehicles with simplicity and ease.

Another important object of the invention is the provision of a tow bar assembly which is rigid in relation to the ball socket but which possesses increased stability during operation with minimized tendency to come out of alignment and which is rigid so as to prevent wear during operation. Since arms are supported by an effective truss arrangement on each side which may be adjusted to effect a congruent attachment between the vehicles, capability of resisting loads, particularly during starting and stopping of the towing vehicle, is enhanced.

SUMMARY OF THE INVENTION

It has been found that a sturdier and more stable tow bar may be constructed utilizing a pair of pivoted diverging arms extending rearwardly from a rigid elongated frame member which extends rearwardly from the towing vehicle utilizing a slide which is positionable at selected locations along the rigid frame member, and having diverging links pivoted on one end on the slide and on the other end on respective diverging arms. It has also been found that a safety chain may be provided which has connection on one end with the towing vehicle and an intermediate connection to a respective diverging arm with positioning means carried adjacent a rearward free end of the arm and a length of chain which projects laterally across the tow bar assembly for securing the tow bar against lateral movement in respect to the towed vehicle.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 3 is an enlarged longitudinal sectional elevation taken on the line 3—3 in FIG. 2; and FIG. 4 is a side elevation illustrating chain connections, in accordance with a modified embodiment of the invention for positioning and securing the tow bar and for safety.

DESCRIPTION OF A PREFERRED EMBODIMENT

Figure 1:
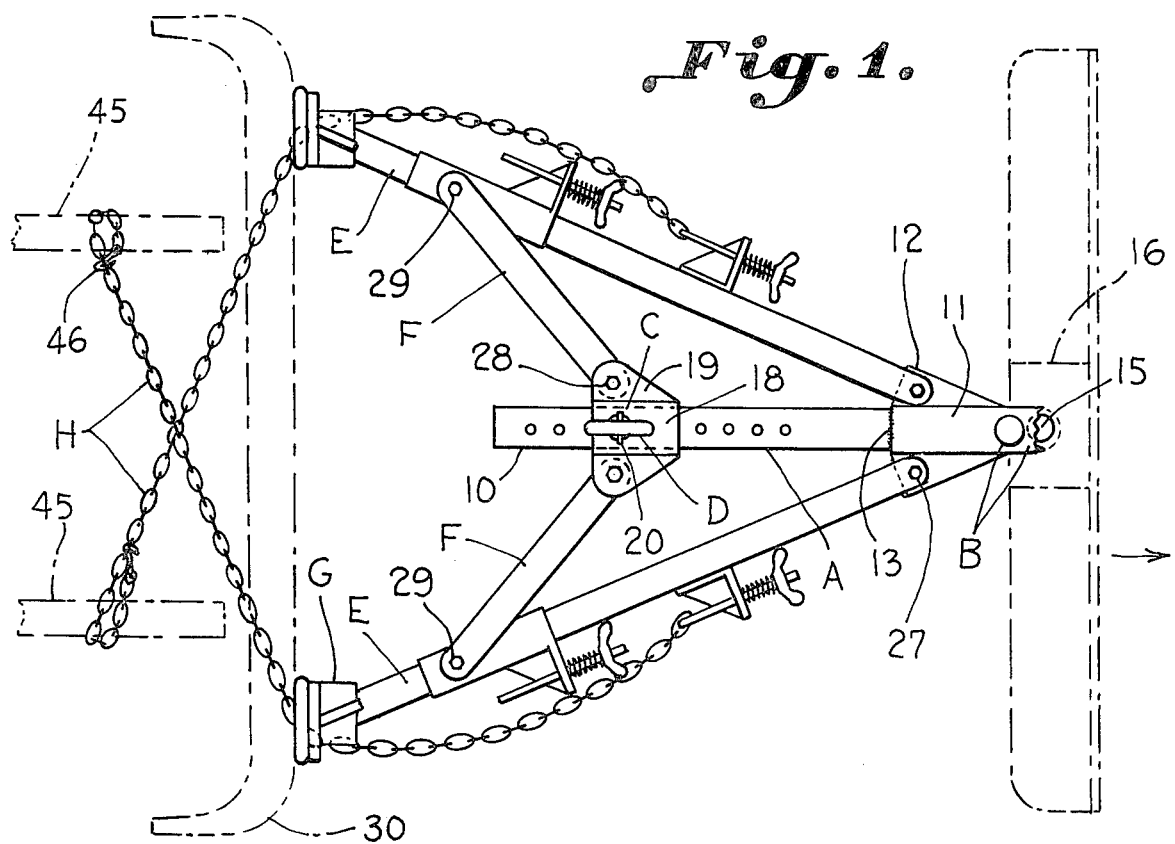
FIG. 1 is a top plan view illustrating a tow bar constructed in accordance with a preferred embodiment of the invention attached to a towing vehicle.
Figure 2:
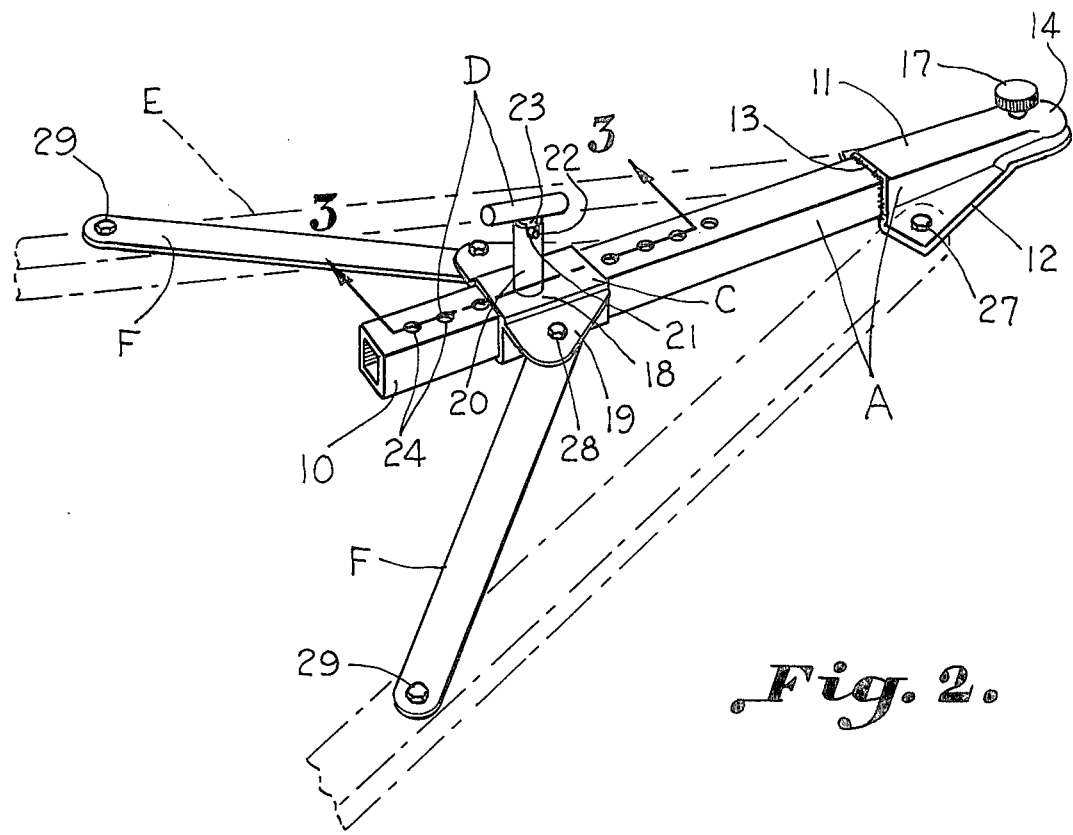
FIG. 2 is an enlarged perspective view further illustrating the rigid elongated longitudinal central frame of the tow bar carrying a slide mounted thereon with means for positioning the slide at a selected longitudinal position with diverging links pivotally connected thereto on one end and having pivotal connection with a diverging arm of the tow bar on the other end.

The drawings illustrate tow bar apparatus having an elongated longitudinal frame member A. Securement means B, carried adjacent a forward end of said frame member, fasten the frame member to a towing vehicle. A mounting element C is carried on the frame member, being mounted thereon for longitudinal sliding movement. Interengaging or clamping means D fix the mounting element rigidly on an intermediate portion of the frame member toward a rearward free end thereof. A pair of diverging towing arms E are each pivotally connected adjacent one end to the frame adjacent the forward end thereof. A pair of link or bracing members F each have a first pivotal connection adjacent one end of said mounting element and a second pivotal connection on a respective arm forwardly of the first pivotal connection.

A chain fastening assembly has means securing one end of each of a pair of chains to the towing vehicle. Means carried by an intermediate portion of each of the arms fasten an intermediate portion of each of the chains thereto. A bracket G slidably positions a rearwardly extending portion of each of the chains. A length H of each of the chains extend inwardly laterally across each other carrying fastening means for securement at transversely spaced locations on a towed vehicle.

The elongated longitudinal frame member A is illustrated as including a tubular member having a rectangular cross section such as is designated at 10. Also included in the frame member is a wedge-shaped bracket having an intermediate portion 11 which is illustrated in the form of a length of tubular material slightly larger than that from which the frame member 10 is constructed. A pair of diverging flanges 12 extends outwardly from the intermediate portion 11 on each side thereof, the intermediate portion 11 being secured as by welding 13 to the tubular frame member 10. The intermediate portion 11 has securement means B carried thereby for attachment to the towing vehicle including a ball socket 14 for containing a towing ball 15 carried by a truck mounting plate 16 illustrated in broken lines in FIG. 1. The securement means B also includes the usual threaded member 17 for clamping the socket member 14 in position upon the ball 15.

A mounting element or slide C includes a rectangular frame or slide portion 18 which is illustrated in the form of a length of rectangular tubular section slightly larger than the tubular frame member 10 so as to slide longitudinally thereon. A pair of mounting flanges or bracket portions diverge laterally outwardly as illustrated at 19 forming with the slide portion 18 the mounting element C. Extending upwardly from and fixed to a central portion of an upper surface of the slide C is an annular tubular housing 20 forming a part of the interengaging means D. The housing 20 has opposed notches 21 opening in an upper edge thereof for receiving a pin 22 carried transversely of a plunger 23 carried within the housing 20 and extending through an upper portion of the slide portion 18 for reception in a selected longitudinally spaced opening 24 carried in the tubular member 10. A compression spring 25 is illustrated in FIG. 3 as being carried within the tubular housing 20 urging the plunger 23 downwardly in position within a selected opening 24 for rigidly fixing the slide C with respect to the central longitudinal frame member A. In order to release the slide member C, the plunger 23 is raised by pulling the handle 26 upwardly against the force of the spring 25 and turning the shank or plunger portion so as to support the pin 22 upon an upper portion of the housing 20 out of the opposed notches 21.

The diverging towing arms E are constructed of tubular sections which are pivotally mounted upon the laterally extending flange 12 as illustrated at 27 on one end. The arms extend rearwardly and the extent to which they diverge is controlled by the relative position of the slide C upon longitudinal frame member A as determined by the fixing of the interengaging means D.

A pair of link members F are pivotally connected on one end to the laterally extending bracket member 19 as at 28 while they are secured on the opposite end as at 29 to a respective arm E.

During towing, the tendency is for the diverging arms E to move inwardly. This force is effectively resisted by the links F which, with opposed portions of the arms E and the included portion of the central longitudinal frame member A, trusses on each side to stabilize the tow bar during a towing operation. When applying brakes, the tendency of the arms is to diverge even more and this tendency is also resisted by such truss members described above. Thus, it is possible to adjust the positioning of the arms and hold them rigidly in place determining the spread of the tow bar and maintaining the arms rigidly in place so as not to be moved by towing or stopping of the towing vehicle avoiding wear and affording stability to the towing arrangement hereof.

The arms E terminate adjacent a bumper 30 of a towed vehicle having affixed thereto an intermediate portion of a vertical bracket or standard G. The bracket G is preferably constructed of rectangular tubular material and has a cutaway lower portion 31 which has spaced openings 31a and 31b therein permitting respective chain portions to pass therethrough. A pad member 32 extends vertically across a front face of each of the vertical bracket members G for engaging the bumper 30. A first pair of chains 33 is illustrated in FIG. 4 as having hook means 34 and 35 at respective ends for attachment to the bumper passing thereover to a bracket 36 carried by a respective post or bracket G. The hook 34 is illustrated as carrying a wing nut 37 which is mounted within the bracket 36.

A second chain which has a freely suspended portion 38 (FIG. 4) is also used for securing the towed vehicle to the towing apparatus. A hook 39 carried on the end of the second chain provides for attachment of the chain to the plate 16. The second chain is also secured by a hook 40 to a bracket 41 carried by an outside portion of a respective arm E. Wing nuts 42 are carried on an opposite end of a shank portion of hook 40 and a compression spring 43 is carried between the wing nut and the bracket 41. A length of chain 44 extends through one of the spaced holes in the lower portion of the bracket G and extends laterally for securement about a frame portion 51 of the vehicle. A pair of the second chains described above is provided to insure symmetrical support and loading.

A third pair of chains 47 has attachment to a hook 48 carried by the bracket 49 which is fixed to the arm and which is provided with a compression spring 50 similar to that arrangement illustrated at 43. The opposite end of the chain 47 is secured to a portion of the frame 51 of the vehicle being towed.

The chains 33 serve to hold the tow bar down on the bumper of the vehicle being towed. The chain having the transverse length H serves as a safety chain by means of the freely suspended portion 38 and as a towing chain since it has a connection as at 40 and is maintained in diverging relation with a similar chain on the opposite arm A to keep the bar from slipping laterally on the bumper of the towed vehicle. The chain 47 holds the tow bar up on the bumper and serves as a towing chain.

In FIG. 1 there is illustrated one particular way the chains can be connected to the towing apparatus and to the vehicle that is to be towed. FIG. 4 illustrates a modified form of the invention and the chains are connected to towing apparatus and the vehicle that is to be towed in a different manner.

The manner in which the various chains can be connected to secure the towing apparatus to the towed vehicle will vary according to the type of vehicle being towed and as required by the particular towing operation. Any conventional arrangement of securing the chains can be utilized.

While a preferred embodiment of the invention has been described using specific terms, such description is for illustrative purposes only, and it is to be understood that changes and variations may be made without departing from the spirit or scope of the following claims.

What is claimed is:

1. A tow bar apparatus comprising:
   an elongated longitudinal central frame member;
   means carried adjacent a forward end of said frame member for securement to a towing vehicle;
   a pair of diverging towing arms pivotally connected and diverging rearwardly from adjacent said forward end of said central frame member;
   connection means carried adjacent rear ends of said diverging arms for being connected to a towed vehicle;
   a plurality of longitudinally spaced openings provided in said central frame member;
   a mounting element carried for longitudinal sliding movement on said frame member;

a removable member carried by said mounting element for selectively inserting into one of said spaced openings adjustably fixing said mounting element rigidly on said central frame member;

a pair of link members each having an outer end and an inner end;

means pivotally connecting said outer ends of said link members to respective one of said diverging towing arms, and means pivotally connecting said inner ends of said link members to laterally spaced points on said mounting element providing a rigid connection between said central frame and said towing arms.

2. The structure set forth in claim 1 wherein said removable member is a spring loaded retractable plunger.

* * * * *